(12) United States Patent
Schmidt

(10) Patent No.: US 6,802,275 B2
(45) Date of Patent: Oct. 12, 2004

(54) BALL-AND-SOCKET ASSEMBLY

(76) Inventor: Tibor Schmidt, R.R. #2, Petersburg, Ontario (CA)

( * ) Notice: Subject to any disclaimer, the term of this patent is extended or adjusted under 35 U.S.C. 154(b) by 0 days.

(21) Appl. No.: 10/237,892

(22) Filed: Sep. 10, 2002

(65) Prior Publication Data
US 2004/0045493 A1 Mar. 11, 2004

(51) Int. Cl.$^7$ .............................................. B63B 17/00
(52) U.S. Cl. ..................... 114/361; 403/122; 403/141
(58) Field of Search ..................... 114/361; 403/122, 403/130, 141, 143, 90, 132, 133

(56) References Cited

U.S. PATENT DOCUMENTS

| | | | |
|---|---|---|---|
| 2,696,392 A | 12/1954 | Case | |
| 2,755,105 A | 7/1956 | Wells | |
| 3,112,910 A | * 12/1963 | Bal | 248/161 |
| 3,489,393 A | 1/1970 | Anson | |
| 3,776,649 A | 12/1973 | Kemezys | |
| 3,829,153 A | * 8/1974 | Fussell et al. | 296/90 |
| 3,853,414 A | 12/1974 | Hirano et al. | |
| 3,874,598 A | * 4/1975 | Havens | 239/542 |
| 4,111,570 A | 9/1978 | Morel | |
| 4,266,883 A | 5/1981 | Riester et al. | |
| 4,410,295 A | 10/1983 | Ersoy et al. | |
| 4,565,345 A | * 1/1986 | Templeman | 248/481 |
| 4,673,376 A | * 6/1987 | Fender | 464/158 |
| 4,733,625 A | 3/1988 | Allen | |
| 5,019,105 A | 5/1991 | Wiley | |
| 5,152,628 A | 10/1992 | Broszat et al. | |
| 6,001,491 A | * 12/1999 | Bayer et al. | 428/500 |
| 6,481,914 B1 | * 11/2002 | Grenier et al. | 403/122 |

FOREIGN PATENT DOCUMENTS

FR  2 388 157  * 12/1978

* cited by examiner

Primary Examiner—Sherman Basinger

(57) ABSTRACT

The invention provides a ball-and-socket assembly having a ball element including a ball portion and a socket housing including a socket formed by a flexible socket wall for receiving and releasably retaining the ball portion in the socket. The ball-and-socket assembly also includes a sleeve mounted on the socket housing and movable relative to the socket between an engaged position, in which the sleeve reinforces the flexible socket wall such that the socket wall retains the ball portion in the socket, and a disengaged position, in which the socket wall is not reinforced by the sleeve and the ball portion is receivable in the socket and releasable from the socket.

18 Claims, 6 Drawing Sheets

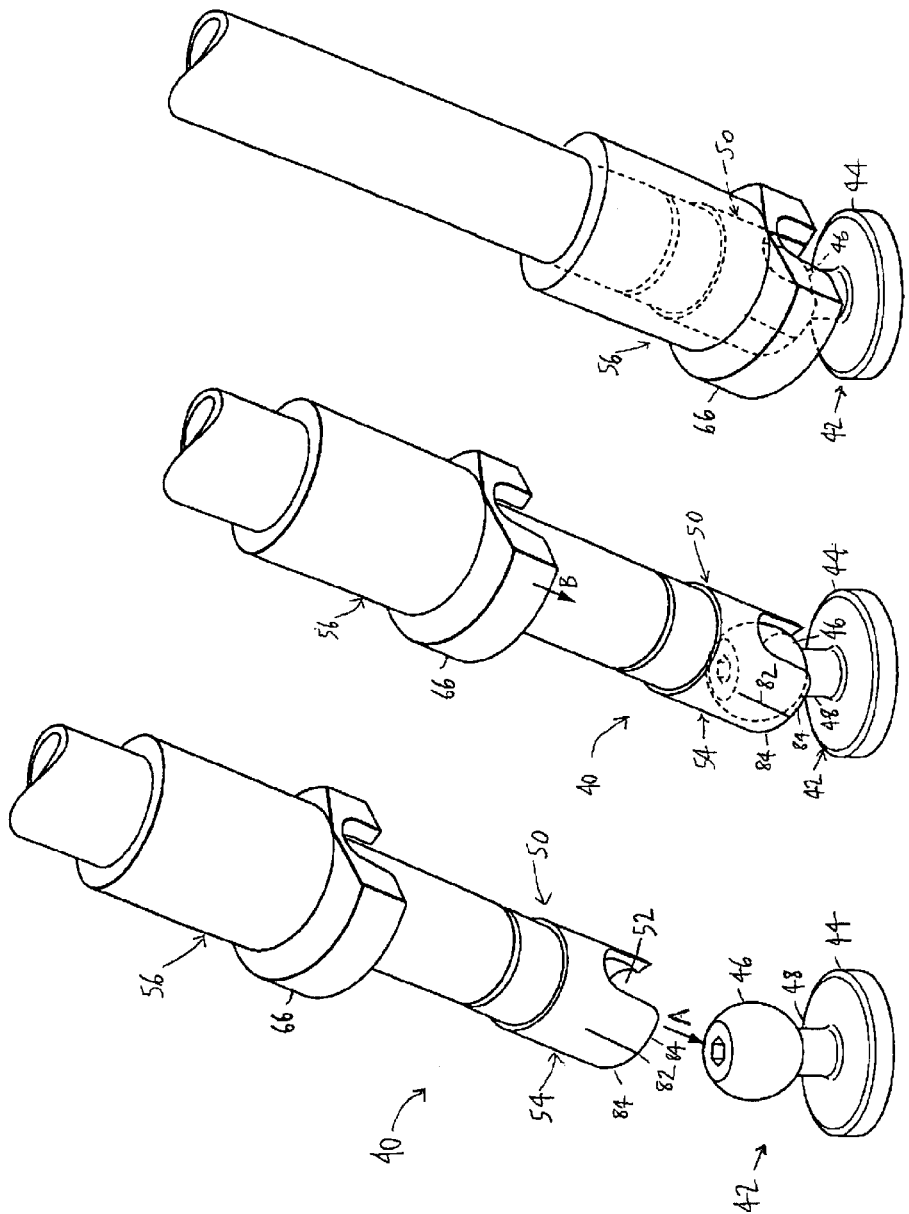

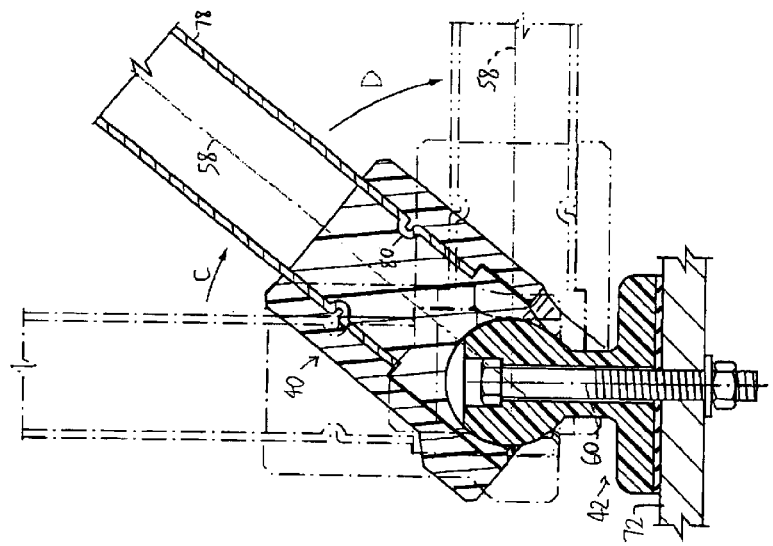
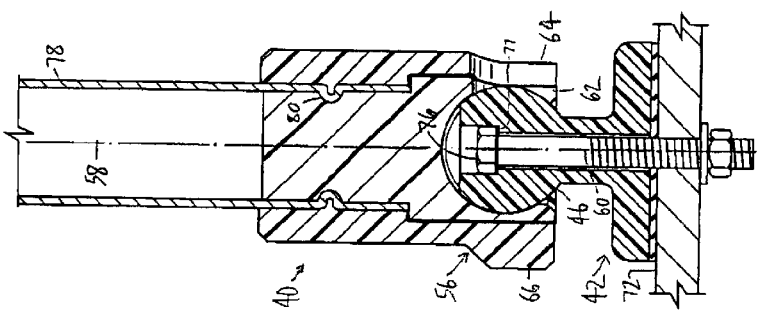
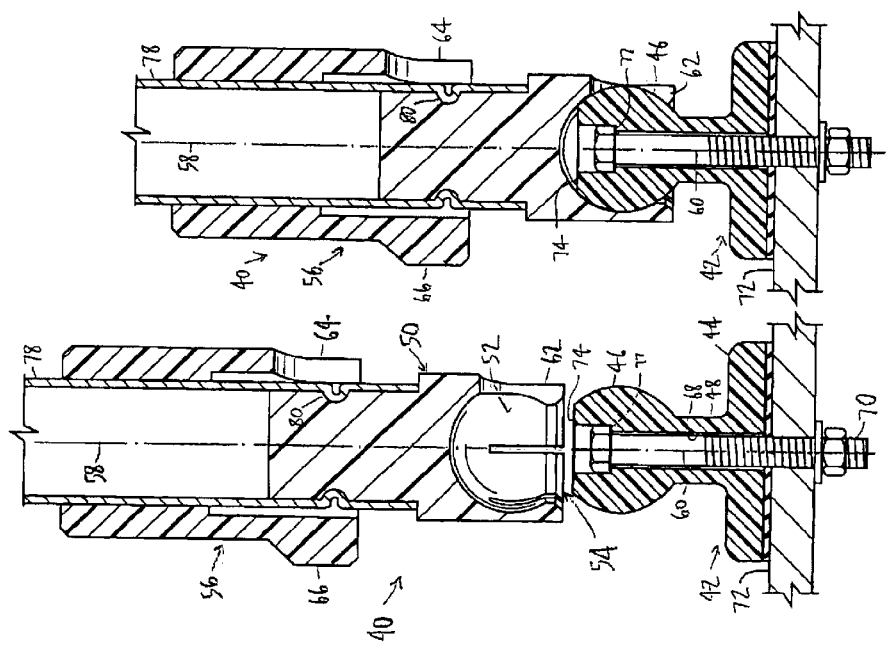
FIG. 7      FIG. 8      FIG. 9      FIG. 10

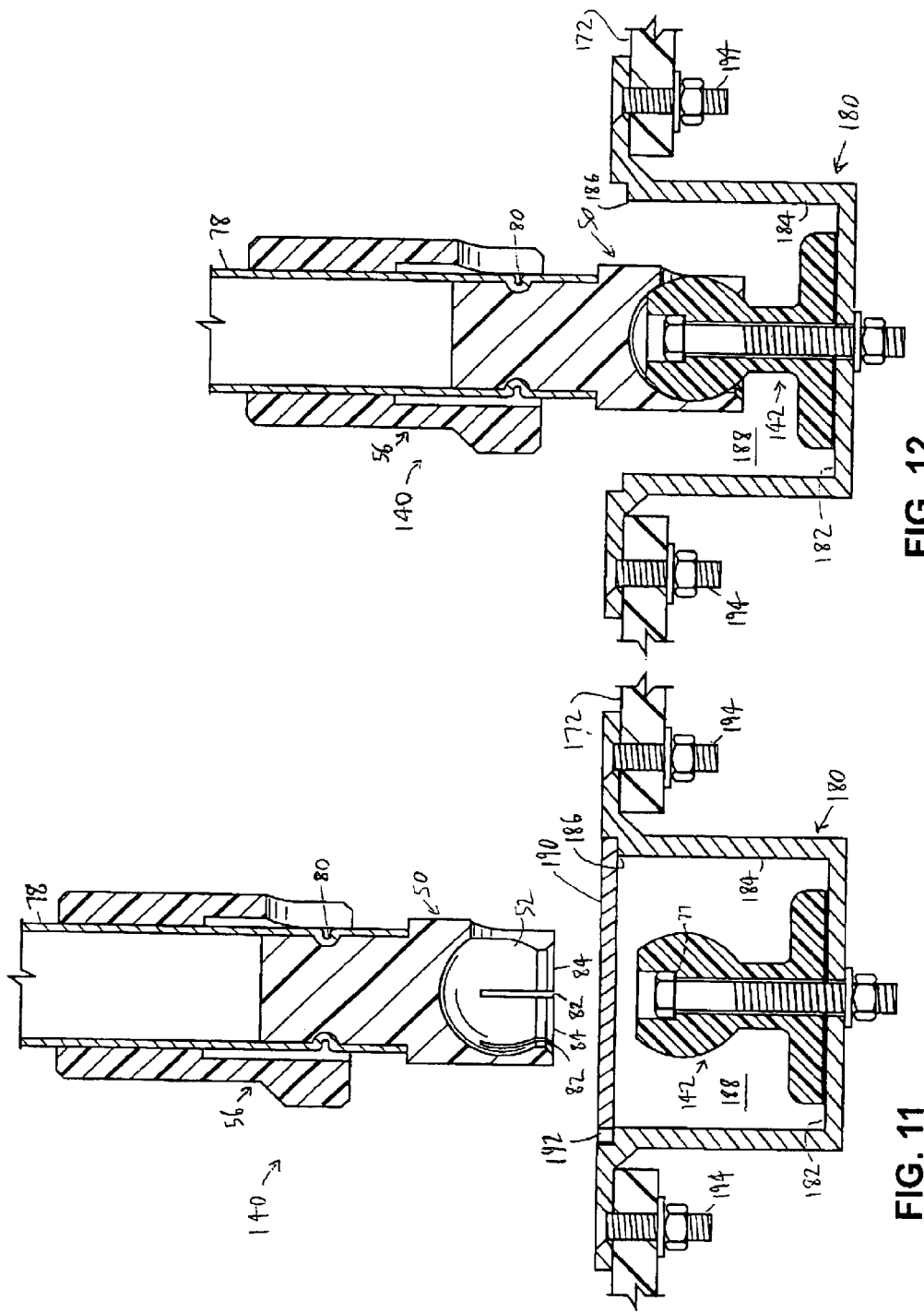

BALL-AND-SOCKET ASSEMBLY

FIELD OF THE INVENTION

This invention relates to ball-and-socket assemblies and, more particularly, a ball-and-socket assembly having a sleeve for reinforcing a flexible socket wall when a ball is received in a socket.

BACKGROUND OF THE INVENTION

Many ball-and-socket couplings are known for use in coupling two objects together. In typical ball-and-socket couplings, a ball is received in a socket, and subsequently retained in the socket to couple the two objects together. When decoupling of the two objects is desired, the ball is released from the socket. The ball, once in the socket, must be retained in the socket to keep the two objects coupled, until release of the ball from the socket is required. In typical ball-and-socket couplings, a socket is defined by a socket wall which is flexible, to permit the ball to be received in the socket, and also to permit the ball to be released from the socket when desired.

However, because of the requirement that the socket wall be flexible to facilitate receiving and releasing the ball, known ball-and-socket couplings have suffered from the disadvantage that unplanned or inadvertent release of the ball from the socket can occur. An unplanned or inadvertent release of the ball from the socket can have serious consequences, as the result is an unexpected decoupling of the objects which had been coupled by the ball-and-socket coupling.

Various mechanisms intended to address the problem of inadvertent release have been proposed. For example, U.S. Pat. No. 4,410,295 (Ersoy et al.) discloses a universal joint construction in which a housing, including a socket into which a ball can be received, is adapted for cooperation with a collar which slides over the exterior of the housing to hold the ball in the socket. However, the ball-and-socket coupling disclosed in Ersoy et al. apparently cannot readily be disassembled, so that release of the ball is not easily accomplished. In short, for a variety of reasons, known ball-and-socket couplings have various disadvantages.

Prior art coupling devices which are not known ball-and-socket couplings are typically used in connection with a boat top, as shown in FIGS. 1 and 2. A typical boat top 20 is shown in FIG. 1, and a typical coupling device 22 used to couple the boat top 20 and a boat body 24 together is shown in FIG. 2. (As will be described, the remainder of the drawings illustrate the present invention.) As can be seen in FIG. 2, the typical coupling device 22 used to secure the boat top 20 to the boat body 24 includes flanges 26, 27 spaced apart to receive a member 28 projecting from a boat top frame element 30, and the member 28 is held between the flanges 26, 27 by a knurled screw 32.

It will be appreciated from FIGS. 1 and 2 that coupling the boat top 20 to the boat body 24 can be a difficult exercise, requiring alignment of a number of members projecting from the boat top frame elements and inserting knurled screws as appropriate. The task of coupling the boat top 20 with the boat body 24 can be very difficult for one person to accomplish alone when typical coupling devices 22 are used. Decoupling of the boat top 20 from the boat body 24 is also inconvenient when typical coupling devices 22 are use Although typical ball-and-socket couplings could be used in place of the typical coupling devices 22 to couple the boat top 20 to the boat body 24, typical ball-and-socket couplings would not provide convenient and effective coupling and decoupling of the boat top 20 and the boat body 24.

There exists a need for a ball-and-socket assembly having a sleeve for reinforcing a flexible socket wall when a ball is received in a socket.

SUMMARY OF THE INVENTION

In a broad aspect of the present invention, there is provided a ball-and-socket assembly having a ball element, a socket housing, and a sleeve. The ball element includes a base and a ball portion spaced apart from the base by a support portion extending from the base, and the socket housing includes a socket formed by a flexible socket wall for receiving and releasably retaining the ball portion in the socket. The sleeve is mounted on the socket housing and movable relative to the socket between an engaged position, in which the sleeve reinforces the flexible socket wall so that the socket wall retains the ball portion in the socket, and a disengaged position, in which the socket wall is not reinforced by the sleeve and the ball portion is receivable in the socket and releasable from the socket. The result is that the ball portion is retained in the socket and the socket housing is movable relative to the ball portion when the ball portion is received in the socket and the sleeve is in the engaged position.

BRIEF DESCRIPTION OF THE DRAWINGS

The invention will be better understood with reference to the drawings, in which:

FIG. 4 is an isometric view of the ball-and-socket assembly of FIG. 3 showing a ball element having a ball portion and a socket housing with a socket formed by a flexible socket wall positioned above the ball element;

FIG. 5 is an isometric view of the ball-and-socket assembly of FIG. 3 showing the ball portion received in the socket with a sleeve mounted on the socket housing and in a disengaged position;

FIG. 6 is an isometric view of the ball-and-socket assembly of FIG. 5 showing the sleeve in an engaged position reinforcing the socket wall and the ball portion retained in the socket;

FIG. 7 is a cross-section view of the ball-and-socket assembly of FIG. 4 showing the socket housing positioned directly above the ball element with a housing longitudinal axis aligned with a ball element longitudinal axis;

FIG. 8 is a cross-section view of the ball-and-socket assembly of FIG. 7 showing the ball portion received in the socket;

FIG. 9 is a cross-section view of the ball-and-socket assembly of FIG. 8 showing the sleeve in an engaged position when the ball portion is received in the socket;

FIG. 10 is a cross-section view showing a range of movement of the socket housing relative to the ball portion which is permitted when the ball portion is received in the socket and the sleeve is in the engaged position;

FIG. 11 is a cross-section view of another embodiment of the ball-and-socket assembly showing a ball element positioned in a ball element housing and a socket housing positioned above the ball element housing, with a lid in place on the ball element housing;

FIG. 12 is a cross-section view of the ball-and-socket assembly of FIG. 11 showing the ball portion received in the socket;

DETAILED DESCRIPTION OF THE PREFERRED EMBODIMENT(S)

Figure 1:
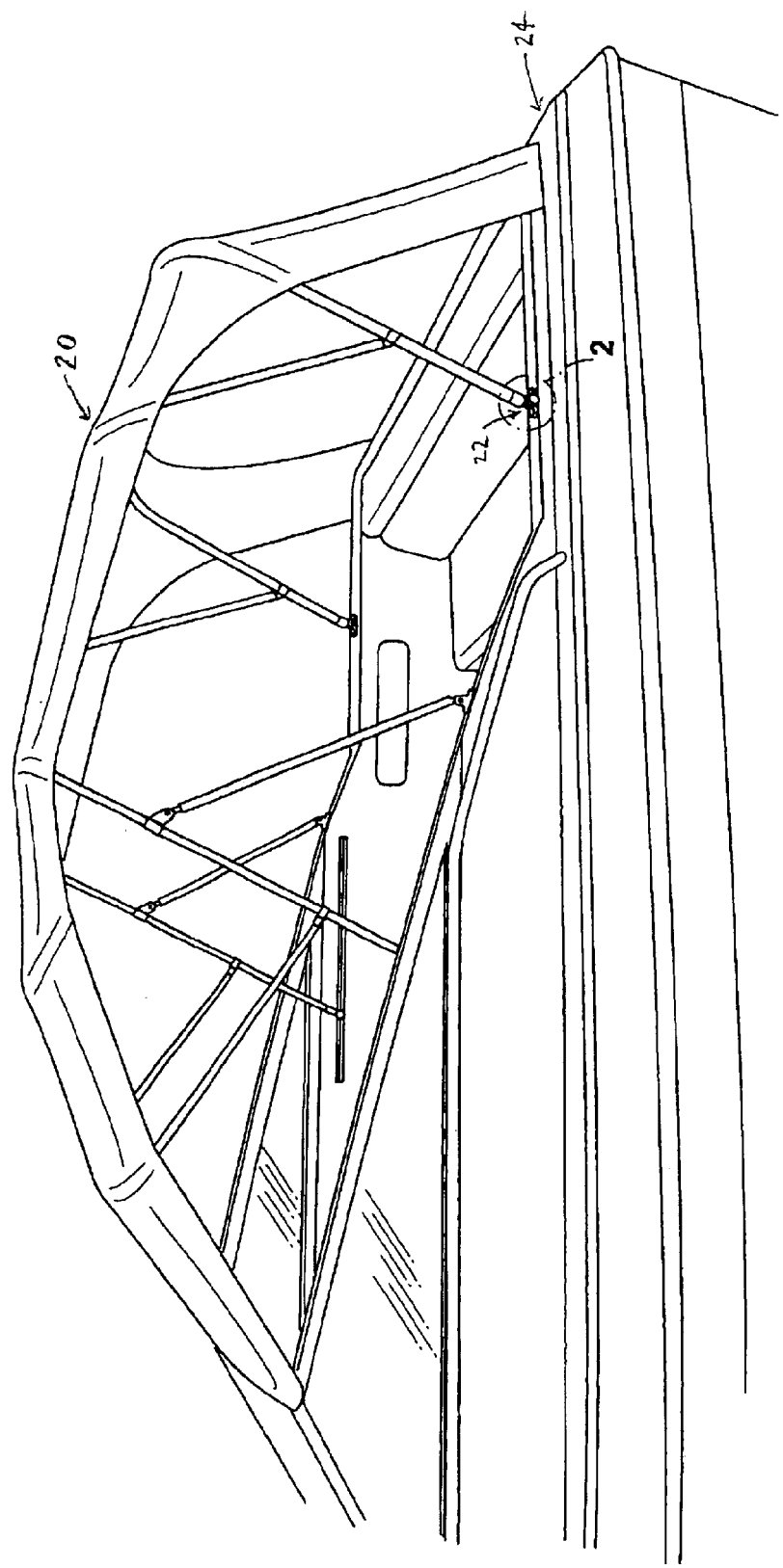
FIG. 1 (also described previously) is an isometric view of a prior art boat top.
Figure 2:
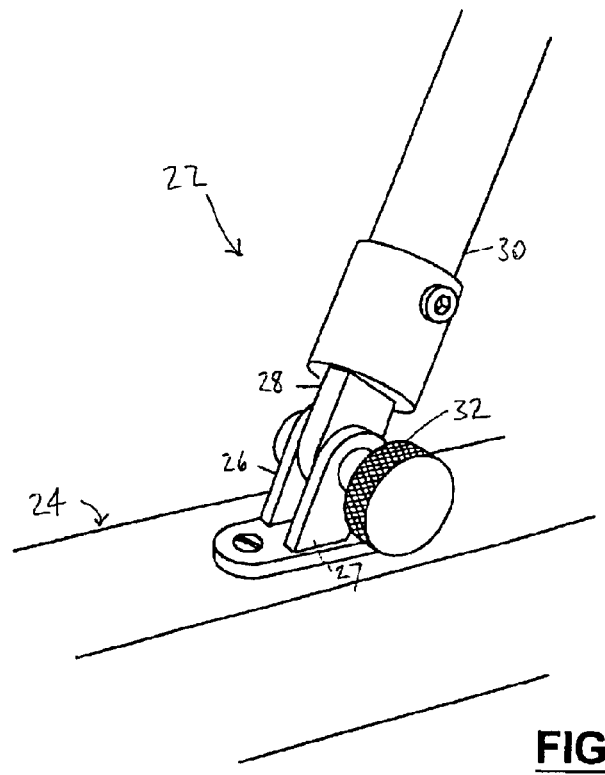
FIG. 2 (also described previously) is an isometric view of a prior art coupling device.
Figure 3:
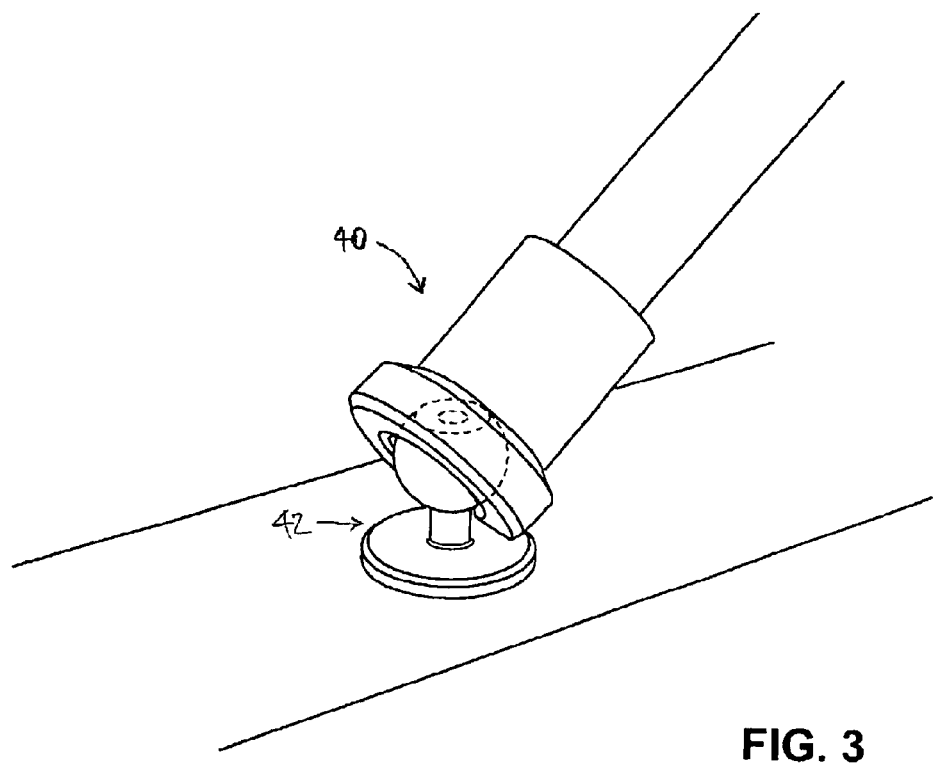
FIG. 3 is an isometric view of a preferred embodiment of the ball-and-socket assembly.

Reference is first made to FIGS. 3–6 to describe a preferred embodiment of a ball-and-socket assembly indicated generally by the numeral 40 in accordance with the invention. As can be seen in FIG. 4, the ball-and-socket assembly has a ball element 42 including a base 44 and a ball portion 46 spaced apart from the base 44 by a support portion 48 extending from the base 44. The ball-and-socket assembly 40 also has a socket housing 50 including a socket 52 formed by a flexible socket wall 54 for receiving and releasably retaining the ball portion 46 in the socket 50. In addition, the ball-and-socket assembly 40 has a sleeve 56 mounted on the socket housing 50 and movable relative to the socket 52 between an engaged position (FIG. 6), in which the sleeve 56 reinforces the flexible socket wall 54 so that the socket wall 54 retains the ball portion 46 in the socket 52, and a disengaged position (FIGS. 4 and 5) in which the socket wall 54 is not reinforced by the sleeve 56 and the ball portion 46 is receivable in the socket 52 and releasable from the socket 52. The result is that the ball portion 46 is retained in the socket 52 and the socket housing 50 is movable relative to the ball portion 46 when the ball portion 46 is received in the socket 52 and the sleeve 56 is in the engaged position.

Preferably, and as will be described, the sleeve 56 is slidably mounted on the socket housing 50.

As can be seen in FIGS. 7–10, the socket housing 50 is coaxial with a housing longitudinal axis 58 and the ball element 42 is coaxial with a ball element longitudinal axis 60. The socket wall 54 includes a slot 62 and the sleeve 56 also includes a slot 64. As shown in FIG. 9, the slot 62 and the slot 64 are alignable with each other when the sleeve 56 is in the engaged position. Because of this, when the ball portion 46 is received in the socket 52, the socket housing 50 is movable relative to the ball portion 46 for positioning the housing longitudinal axis 58 up to at least 90° relative to the ball element longitudinal axis 60.

Preferably, the sleeve 56 includes a ring element 66 for stiffening the socket wall 54 when the ball portion 46 is received in the socket 52 and the sleeve 56 is in the engaged position to enable the socket wall 54 to retain the ball portion 46 in the socket 52. As can be seen in FIGS. 4–6, the ring element 66 preferably includes the slot 64 in the sleeve 56 to permit the socket housing 50 to move relative to the ball portion 46 so that the housing longitudinal axis 58 is positionable up to at least 90° relative to the ball element longitudinal axis 60.

Preferably, and as shown in FIGS. 7–10, the ball portion 46 includes a bore 68 coaxial with the ball element longitudinal axis 60 for receiving a fastener 70 to fasten the ball element 42 to a body 72 and a flattened top area 74 to facilitate the reception of a head portion 76 of the fastener 70 in a slot 77. Any suitable fastener 70 could be used to fasten the ball element 42 to the body 72. Although various arrangements could be used, the fastener 70 shown in FIGS. 7–10 is a nut and bolt arrangement with a washer adjacent to the nut.

Preferably, the ball-and-socket assembly 40 is for coupling a boat top frame 78 to a boat body 72. The ball element 42 preferably is adapted for attachment to the boat body 72, as shown in FIGS. 7–10. Also, the socket housing 50 preferably is adapted for attachment to the boat top frame 78. As shown, the socket housing 50 is secured within the boat top frame 78 by means of a crimp 80 deforming a portion of the boat top frame 78 so that the socket housing 50 is secured to the boat top frame 78. However, the socket housing 50 can be secured to the boat top frame 78 by any suitable means.

Preferably, the socket wall 54 includes a plurality of slits 82 (FIGS. 4–6) to divide the socket wall 54 into a plurality of panels 84, as can be seen in FIGS. 4 and 5. It will be understood that more than one slit 82 divides the socket wall 54 into a plurality of panels 84, but all but one of the slits 82 are hidden from view in FIGS. 4–6. Due to the slits 82, the panels 84 are flexible relative to each other so that the socket wall 54 is sufficiently flexible to receive and release the ball portion 46 of the ball element 42.

Preferably, the ball element 42 and the socket housing 50 comprise a plastic having appropriate hardness and durability characteristics. Although any suitable plastic could be used, a polypropylene copolymer with an ultraviolet light stabilizer has been found to have the appropriate attributes. In addition, it is preferred that the sleeve 56 is slidably mounted on the socket housing 50, and the plastic comprising the sleeve 56 and the socket housing 50 therefore should permit such slidable movement. Also, and as can be seen in FIGS. 4–9, the sleeve 56 preferably is mounted for sliding motion over the boat top frame 78. A typical boat top frame 78 may comprise aluminum tubing or other suitable material, and the plastic comprising the sleeve 56 should permit slidable movement over the boat top frame 78.

Figure 13:
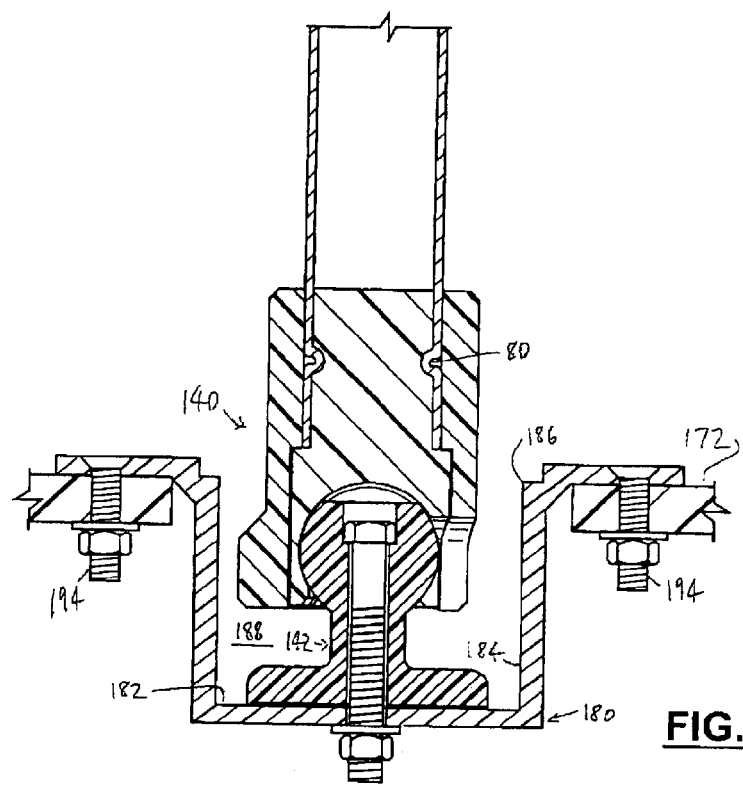
FIG. 13 is a cross-section view of the ball-and-socket assembly of FIG. 12 showing the ball portion received in the socket and the sleeve in an engaged position.
Figure 14:
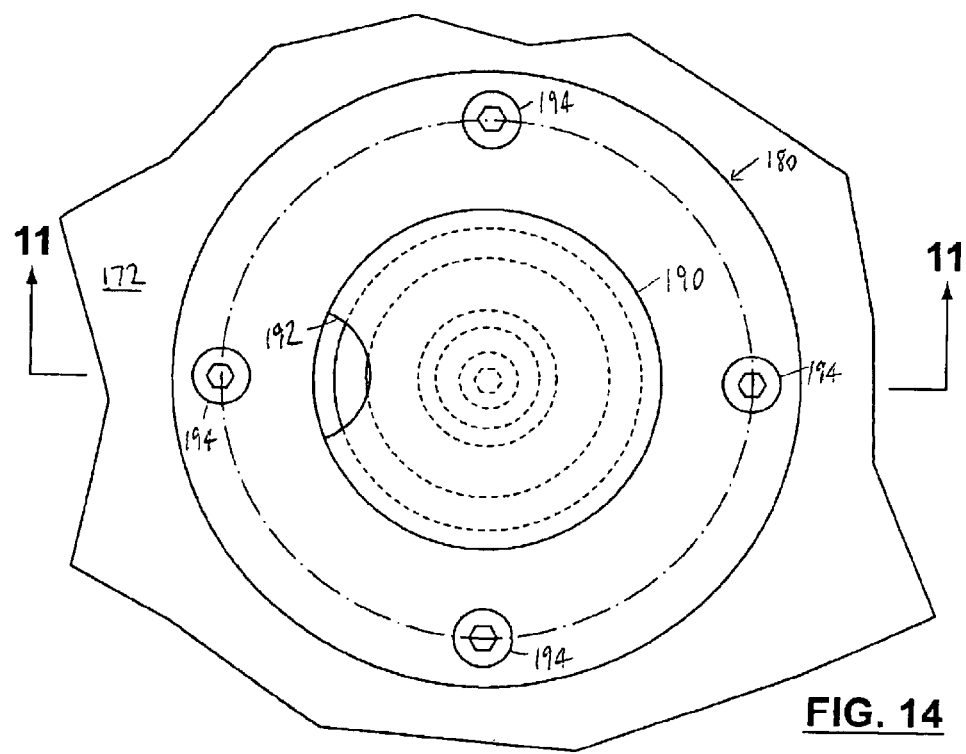
FIG. 14 is a top view of the ball element housing with the lid in position.

In an alternative embodiment, a ball-and-socket assembly 140 includes a ball element housing 180, as shown in FIGS. 11–14. The ball element housing 180 has a floor 182 and a wall portion 184 extending from the floor 182 to a top rim 186 of the wall portion 184. The floor 182 and the wall portion 184 form a cavity 188 open at the top rim 186. As can be seen in FIGS. 11–14, the ball element housing 180 is adapted for installation in a boat body 172. The ball-and-socket assembly 140 includes a ball element 142 which is positioned in the cavity 188 and secured to the floor 182 so that the socket housing 50 can be positioned on the ball element 142 and a ball portion 146 included in the ball element 142 is receivable in the socket 52. Preferably, the ball element 142 is positioned in the cavity 188 so that the ball portion 146 is located between the floor 182 and the top rim 186 of the wall portion 184.

In use, and as can be seen in FIGS. 4–6, the socket housing 50 is first positioned above the ball element 42, with the sleeve 56 in the disengaged position and the socket 52 substantially aligned with the ball portion 46. The socket housing 50 is pressed upon the ball element 42 in the direction indicated by arrow A in FIG. 4 until the ball portion 46 is received in the socket 52, as shown in FIG. 5. At this point, as shown in FIG. 5, the sleeve 56 is still in the disengaged position. The sleeve 56 is slidably moved in the direction indicated by arrow B in FIG. 5 to the engaged position to reinforce the socket wall 54 so that the socket wall 54 retains the ball portion 46 in the socket 52. The coupling of the boat top frame 78 to the boat body 72 is thereby simplified.

Decoupling of the boat top 78 from the boat body 72 is accomplished by, first, moving the sleeve 56 from the engaged position to the disengaged position. Second, the socket housing 50 is pulled away from the ball element 42 in order to release the ball portion 46 from the socket 52.

The slots 62, 64 in the socket wall 54 and in the sleeve 56 respectively permit the socket housing 50 to move relative to the ball portion 46 so that the housing longitudinal axis 58 is positionable up to at least 90° relative to the ball element longitudinal axis 60, as can be seen in FIG. 10. Movement of the boat top frame 78 (and the socket housing 50) relative to the ball portion 46 is indicated by arrows C and D in FIG. 10. This movement facilitates the coupling of the boat top frame 78 to the boat body 72, as well as decoupling.

As can be seen in FIGS. 7–10, when the ball element 42 is fastened to the boat body 72, the ball portion 46 projects a distance beyond the boat body 72, providing an object which can provide an obstacle to movement, for example, movement of persons in and out of the boat. Accordingly, the ball element housing 180 facilitates the attachment of the ball element 142, via the ball element housing 180, in a cavity 188 so that the ball element 142 does not provide an obstacle to movement of persons over the boat body 72. It can be seen, in FIG. 14, that the cavity 188 is covered by a lid 190 which has a bight 192 to permit easy removal of the lid 190 from the ball element housing 180. As can be seen in FIGS. 11–14, the ball element housing 180 is attached to the boat body 72 by any suitable fasteners 194.

It will be evident to those skilled in the art that the invention can take many forms, and that such forms are within the scope of the invention as claimed. Therefore, the spirit and scope of the appended claims should not be limited to the description of the preferred versions contained herein.

I claim:

1. A ball-and-socket assembly having:
   a ball element including a base and a ball portion spaced apart from the base by a support portion extending from the base:
   a socket housing including a socket formed by a flexible socket wall for receiving and releasably retaining the ball portion in the socket:
   a sleeve slidably mounted on the socket housing and movable relative to the socket between an engaged position, in which the sleeve reinforces the flexible socket wall such that the socket wall retains the ball portion in the socket, and a disengaged position, in which the socket wall is not reinforced by the sleeve and the ball portion is receivable in the socket and releasable from the socket:
   the socket housing being coaxial with a housing longitudinal axis and the ball element being coaxial with a ball element longitudinal axis; and
   the socket wall and the sleeve including at least one slot each, said slots being alignable with each other when the ball portion is received in the socket and the sleeve is in the engaged position to permit the socket housing to move relative to the ball portion such that the housing longitudinal axis is positionable between approximately 180° relative to the ball element longitudinal axis and approximately 90° relative to the ball element longitudinal axis.

2. A ball-and-socket assembly according to claim 1 in which the sleeve includes a ring portion for stiffening the socket wall when the ball portion is received in the socket and the sleeve is in the engaged position such that the socket wall retains the ball portion in the socket.

3. A ball-and-socket assembly according to claim 1 in which the sleeve includes a ring portion for stiffening the socket wall when the ball portion is received in the socket and the sleeve is in the engaged position to enable the socket wall to retain the ball portion in the socket, the ring portion including the slot in the sleeve to permit the socket housing to move relative to the ball portion such that the housing longitudinal axis is positionable up to at least 90° relative to the ball element longitudinal axis.

4. A ball-and-socket assembly according to claim 1 which the ball portion includes a bore coaxial with the ball element longitudinal axis for receiving a fastener to fasten the ball element to a body and a flattened top area for receiving a head portion of the fastener.

5. A ball-and-socket assembly for coupling a boat top frame to a boat body, the ball-and-socket assembly having:
   a ball element adapted for attachment to the boat body, the ball element including a base and a ball portion spaced apart from the base by a support portion extending from the base;
   a socket housing adapted for attachment to the boat top frame, the socket housing including a socket formed therein by a flexible socket wall for receiving and releasably retaining the ball portion in the socket; and
   a sleeve mounted on the socket housing and movable relative to the socket between an engaged position, in which the sleeve reinforces the flexible socket wall such that the socket wall retains the ball portion in the socket, and a disengaged position, in which the socket wall is not reinforced by the sleeve and the ball portion is receivable in the socket and releasable from the socket,
   whereby the ball portion is retained in the socket and the socket housing is movable relative to the ball portion when the ball portion is received in the socket and the sleeve is in the engaged position.

6. A ball-and-socket assembly according to claim 5 in which the sleeve is slidably mounted on the socket housing.

7. A ball-and-socket assembly according to claim 5 in which the socket housing is coaxial with a housing longitudinal axis and the ball element is coaxial with a ball element longitudinal axis and in which the socket wall and the sleeve include at least one slot each, said slots being alignable with each other when the ball portion is received in the socket and the sleeve is in the engaged position to permit the socket housing to move relative to the ball portion such that the housing longitudinal axis is positionable up to at least 90° relative to the ball element longitudinal axis.

8. A ball-and-socket assembly according to claim 5 in which the sleeve includes a ring portion for stiffening the socket wall when the ball portion is received in the socket and the sleeve is in the engaged position such that the socket wall retains the ball portion in the socket.

9. A ball-and-socket assembly according to claim 7 in which the sleeve includes a ring portion for stiffening the socket wall when the ball portion is received in the socket and the sleeve is in the engaged position to enable the socket wall to retain the ball portion in the socket, the ring portion including the slot in the sleeve to permit the socket housing to move relative to the ball portion such that the housing longitudinal axis is positionable up to at least 90° relative to the ball element longitudinal axis.

10. A ball-and-socket assembly according to claim 5 in which the socket wall includes a plurality of slits to divide the socket wall into a plurality of panels, the panels being flexible relative to each other such that the socket wall is sufficiently flexible to receive and to release the ball portion of the ball element.

11. A ball-and-socket assembly according to claim 10 in which the ball element comprises a polypropylene copolymer with ultraviolet light stabilizer and the socket housing comprises a polypropylene copolymer with ultraviolet light stabilizer.

12. A ball-and-socket assembly according to claim 8 additionally including a ball element housing having a floor and a wall portion extending from the floor to a top rim of the wall portion, the floor and the wall portion forming a cavity open at the top rim, the ball element housing being adapted for installation in a boat body, and in which the ball element is positioned in the cavity and secured to the floor, such that the socket housing can be positioned on the ball element and the ball portion is receivable in the socket.

13. A ball-and-socket assembly according to claim 12 in which the ball element is positioned in the cavity such that the ball portion is located between the floor and the top rim of the wall portion.

14. A ball-and-socket assembly according to claim 13 in which the ball element housing is positioned in the boat body such that the top rim of the wall portion is substantially flush with a boat body surface adjacent to the ball element housing.

15. A ball-and-socket assembly according to claim 13 in which the ball element housing includes a removable lid, for covering the cavity defined by the floor and the wall portion and the bail element positioned therein.

16. A boat top including:
   a collapsible boat top frame movable between a down position and an up position;
   a boat top cover adapted for attachment to the boat top frame, the cover being stretched over the boat top frame and supported by the boat top frame when the boat top frame is in the up position;
   at least one ball element adapted for attachment to a boat body;
   the boat top frame including at least one socket housing for coupling the boat top frame to the boat body, the socket housing including a socket formed therein by a flexible socket wall for receiving and releasably retaining the ball portion in the socket; and
   a sleeve slidably mounted on said at least one socket housing and movable relative to the socket between an engaged position, in which the sleeve reinforces the flexible socket wall such that the socket wall retains the ball portion in the socket, and a disengaged position, in which the socket wall is not reinforced by the sleeve and the ball portion is receivable in the socket and releasable from the socket,
whereby the ball portion is retained in the socket and said at least one socket housing is movable relative to the ball portion when the ball portion is received in the socket and the sleeve is in the engaged position.

17. A boat top according to claim 16 in which the sleeve includes a ring portion for stiffening the socket wall when the ball portion is received in the socket and the sleeve is in the engaged position such that the socket wall retains the ball portion in the socket.

18. In a ball-and-socket assembly for coupling a boat top frame to a boat body, the ball-and-socket assembly including a ball element adapted for attachment to the boat body and a socket housing adapted for attachment to the boat top frame, the ball element including a base and a ball portion spaced apart from the base by a support portion, the socket housing including a socket formed therein by a flexible socket wall for receiving and releasably retaining the ball portion, the improvement comprising a sleeve slidably mounted on the socket housing and movable relative to the socket between an engaged position, in which the sleeve reinforces the socket wall such that the socket wall retains the ball portion in the socket, and a disengaged position, in which the socket wall is not reinforced by the sleeve and the ball portion is receivable in the socket and releasable from the socket, whereby the ball portion is retained in the socket and the socket housing is movable relative to the ball portion when the ball portion is received in the socket and the sleeve is in the engaged position.

* * * * *